United States Patent [19]

Huang et al.

[11] Patent Number: 5,528,210
[45] Date of Patent: Jun. 18, 1996

[54] W-SHAPED SUPERCONDUCTING ELECTROMAGNETIC SYSTEM FOR MAGNETIC LEVITATION VEHICLES

[75] Inventors: Xianrui Huang; Joseph A. Waynert; Charles M. Weber; Minfeng Xu, all of Forest, Va.

[73] Assignee: The Babcock & Wilcox Company, New Orleans, La.

[21] Appl. No.: 339,263

[22] Filed: Nov. 10, 1994

[51] Int. Cl.$^6$ ............................. H01F 6/00; B60L 13/00
[52] U.S. Cl. ..................... 335/216; 335/296; 335/297; 310/12; 104/285; 104/286
[58] Field of Search ........................... 335/216, 296, 335/297; 310/12, 13; 104/281, 285, 286

[56] References Cited

U.S. PATENT DOCUMENTS 5,249,529  10/1993  Herbermann .................... 104/281

Primary Examiner—Leo P. Picard
Assistant Examiner—Raymond M. Barrera
Attorney, Agent, or Firm—Robert J. Edwards

[57] ABSTRACT

An electromagnetic system for a magnetic levitation vehicle comprises a "W" shaped magnet core having a center pole wound by a superconducting coil and side poles on opposite sides of the center pole, each wound by an ambient temperature coil. Quasi-dc power is supplied to the central superconducting coil for levitation of the vehicle with respect to a rail along which the vehicle is meant to move. The ambient temperature coils are connected in series to each and other and powered with ac power for trimming and controlling the gap between the magnet and the rail.

11 Claims, 1 Drawing Sheet

W-SHAPED SUPERCONDUCTING ELECTROMAGNETIC SYSTEM FOR MAGNETIC LEVITATION VEHICLES

FIELD AND BACKGROUND OF THE INVENTION

The present invention relates, in general, to magnetic levitation vehicles and, in particular, to a new and useful W-shaped magnet arrangement.

Conventional iron-core electromagnetic systems (EMS) for magnetic levitation of vehicles have a limitation in that they can function only with a small (about 10 mm) levitation air gap clearance. An electrodynamic system (EDS) using a superconducting coil can achieve a large magnetic force, thus enabling the levitated vehicle to maintain a large clearance. It has a disadvantage, however, of producing a large amount of stray magnetic field. The present invention retains the advantages of both an EMS and EDS system, and uses a ferromagnetic core that confines the magnetic flux, thus reducing stray field. The invention also generates a large magnetic levitation force, thus allowing a large levitation gap clearance.

U.S. Pat. No. 4,953,470 discloses an attraction type magnetic levitation vehicle system where the magnet is not "W" shaped, but has rectangular-wave-shaped magnetic pole surfaces consisting of grooves and teeth extending in the direction of the track. This is not like the "W" shaped magnet to be described in connection with the present invention, and which has flat pole surfaces and a center pole that is approximately twice the size of each of the two side poles. U.S. Pat. No. 4,953,470 also has dc current components in each of the pole coils and the directions of the dc current in adjacent coils are alternate from coil to coil. The reference uses no built-in gap adjustment mechanism. Rectangular exciting waves are applied to each pole coil for propulsion purposes.

U.S. Pat. No. 4,140,063 discloses an electromagnetic suspension and guide system for magnetically suspended vehicles. A three-legged magnetic core in this reference has no coil winding in the center core (pole). This is very different from the "W" shaped magnet of the invention where the center pole has a superconducting coil that provides the major lifting force for the inventive system. Further, the center pole in U.S. Pat. No. 4,140,063 is not approximately twice the size of the side poles as in the invention. The reference system uses two side coils for levitation as well as adjustments. This requires a continuous current (or a dc current component) flowing through the coils. In U.S. Pat. No. 4,140,063 the magnet has to be mounted transversely, with respect to the travel direction and the overhanging rails, to have corresponding slots to provide pole lines for the system to function properly for lateral adjustments. The reference system also uses conventional coils for levitation, whereas the "W" shaped magnet of the invention uses a superconducting coil for levitation and has quasi-dc current in the superconducting coil.

U.S. Pat. No. 3,890,906 discloses a linear synchronous motor for magnetically levitated vehicles. This system is different from the invention in that the reference system does not have any magnetic core and poles in the coils for magnetic flux enhancement, while the "W" shaped magnet uses a magnetic core with three poles. The reference uses magnetic repulsion between superconducting coils for levitation, whereas the inventive "W" shaped magnet uses attraction between the magnet and the iron rail for levitation.

U.S. Pat. No. 3,842,750 discloses an electromagnetic system for the guided suspension of a movable vehicle. The differences between this system and the invention are similar to the differences between U.S. Pat. No. 3,890,906 and the invention. U.S. Pat. No. 3,842,750 has no magnetic poles in the superconducting coils and uses magnetic repulsion for levitation through eddy current generated in the non-magnetic reaction rail.

U.S. Pat. No. 3,797,403 discloses a power electromagnetic suspension and guide system for vehicles where the pole is "T" shaped thus providing levitation and gap adjustment through one coil. This reference uses two coils on a crossbar to adjust the lateral gaps. The magnets disclosed are conventional magnets, and not magnets with a superconducting coil mounted on the center pole.

U.S. Pat. No. 3,524,155 discloses a slotted pole solenoid having an E-shaped magnetic core. The magnet is a long slotted magnet that is different from the "W" shaped magnet of the invention, the latter has a square pole cross-section for its side poles. The reference magnet has no trim coil and is for miniaturization designs that are for automation applications, not for large scale magnetic levitation applications. The magnet in this reference is designed to be stationary to attract a moving armature and is not a superconducting magnet.

SUMMARY OF THE INVENTION

As noted above, the present invention utilizes a W-shaped magnet.

The "W" shaped magnet uses a center coil mounted on a center pole and two trim coils mounted on two side poles. The two side pole trim coils adjust the gap between the magnet and a rail track. Quasi-dc current is only supplied to the center pole coil that is superconducting and there is no dc current supplied to the two trim coils. Quasi-dc current is a term used to indicate that the direct current supply to the center pole coil has to be adjusted to accommodate for changes in the weight of the moving vehicle.

A large size center pole in the "W" shaped magnet provides the magnet with a large magnetic flux passage that avoids serious iron saturation in the center pole. The two side coils in the "W" shaped magnet are for trimming only so that only ac current is required to flow in the side coils for adjusting the gaps between the magnet and the rail. The "W" shaped magnet is mounted with all three magnet poles along the direction of the rail, and the rail does not need slots.

The "W" shaped magnet uses magnetic attraction between the magnet and the rail for levitation. The "W" shaped magnet's center pole is straight and the gap adjustment is provided through the two trim coils mounted on the two side poles as noted above.

The "W" shaped magnet moves with the vehicle or train and constantly adjusts the gaps between the moving magnet and the stationary rail track.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
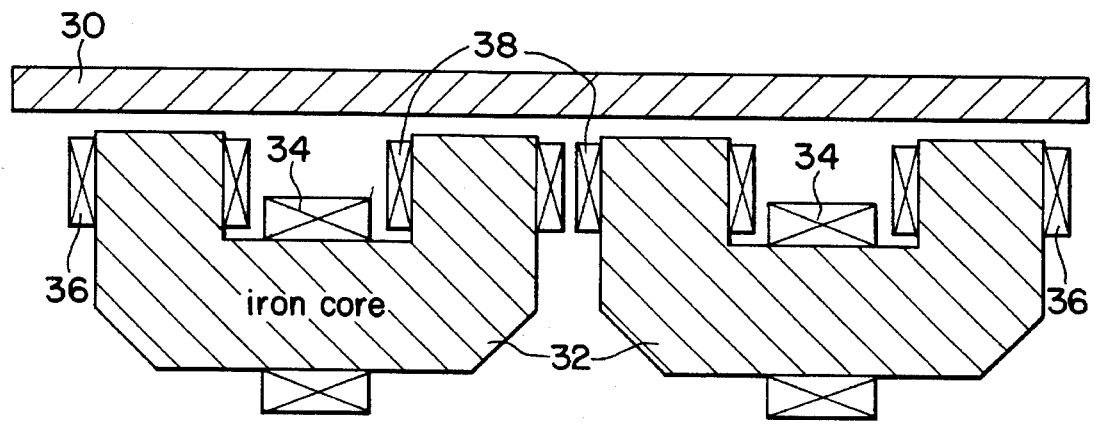
FIG. 1 is a schematic representation of two "U" shaped magnets in an arrangement which is different from that of the present invention.
Figure 2:
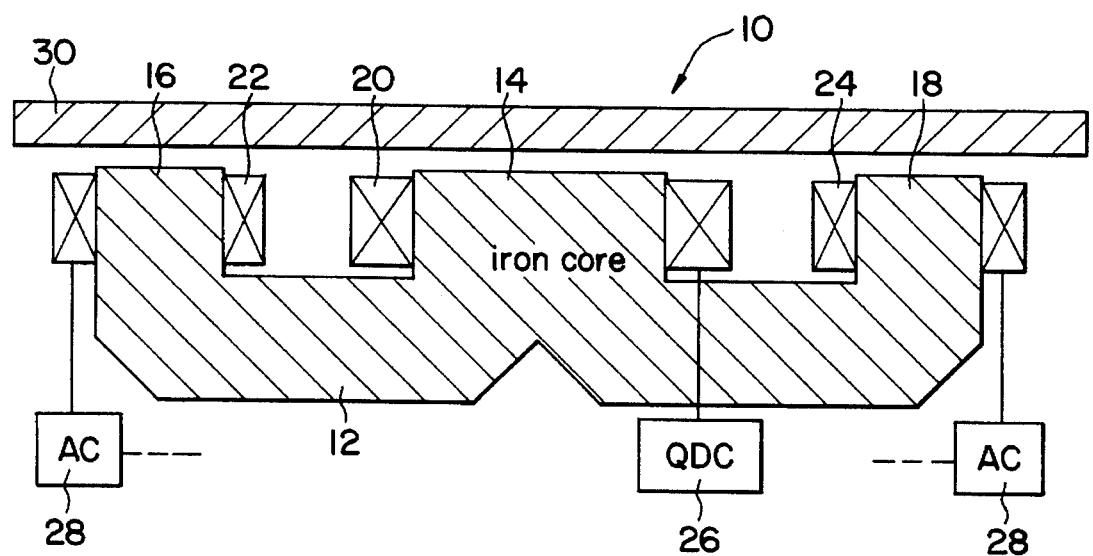
FIG. 2 is a view similar to FIG. 1, illustrating the present invention.

Referring to the drawings in particular, the invention is embodied in FIG. 2 while an alternate non-inventive arrangement in shown in FIG. 1 for comparison.

A "W" shaped superconducting electromagnetic system 10 is illustrated in FIG. 2. It has a "W" shaped iron core 12 whose central leg 14 is larger than, that is, has approximately twice the cross-sectional area of its side legs 16 and 18. Three coils 20, 22 and 24 are mounted on these legs, center coil 20 is a superconducting coil and two normal (that is ambient temperature) coils 22 and 24 are connected in series on the side legs 16 and 18. The superconducting coil 20, operated in a quasi-dc mode, provides the main levitation force. The normal coils are used to provide compensation for fast changes in air gap distance between the rail 30 and the core 12, to maintain vehicle stability.

As shown in FIG. 2, the quasi-dc power is supplied by a schematically illustrated power supply and superconducting coil controller 26 while the series connected ambient temperature coils 22 and 24 are shown schematically connected to ac gap adjusting power supplies 28.

The "W" magnet is a major improvement over a "U" shaped electromagnetic levitation system, which itself is a recent innovation identified as a promising concept by the System Concept Definition studies funded by the National Maglev Initiative. Similar to a "W" magnet, a "U" shaped EMS shown in FIG. 1, has a "U" shaped iron core 32, one superconducting coil 34, mounted on its central arm, and two normal coils 36, 38 mounted on its two legs.

Both the "W" magnet and the "U" magnet can function with a large levitation air gap clearance between core(s) and rail 30, and produce a small stray magnetic field. However, the "W" magnet has the following advantages over the "U" magnet.

The "W" magnet replaces the two equivalent "U" magnets shown in FIG. 1, and its levitation force is more than 50% higher than the pair of "U" magnets with the same excitation, and three times higher with the same level of iron core field. The payload multiple (payload over magnet weight) is improved from 3 to 5 (same excitation) or 11 (same iron core field).

Manufacturing costs for the magnets are reduced, since a single superconducting coil replaces two coils in the "U" magnet. In addition, the iron core laminates of the "W" magnet are one piece, and the assembly is simple and completely independent of the superconducting and normal coils.

Reliability is improved, since a single superconducting coil, power supply and controller replaces two superconducting coils in the "U" magnet.

Operating costs are reduced since heat losses from the single superconducting coil are 30 to 50% less than the losses from the two "U" superconducting coils.

Maintainability is improved, since each magnet coil 20, 22, 24 can be removed and replaced by simply sliding it off its pole, whereas in the "U" magnet, the core must be dismantled to remove or replace the superconducting coil 34.

While a specific embodiment of the invention has been shown and described in detail to illustrate the application of the principles of the invention, it will be understood that the invention may be embodied otherwise without departing from such principles.

What is claimed is:

1. An electromagnetic system for a magnetic levitation vehicle for movement along a rail, comprising:
    a "W" shaped electromagnetic core having a center pole and a pair of side poles spaced on opposite sides of the center pole, the center and side poles having areas for forming gaps with the rail as a vehicle containing the magnet moves along the rail, the area of the center pole being larger than the area of each of the side poles;
    a superconducting coil engaged as a core winding on the center pole;
    a pair of ambient temperature coils each engaged as core windings on respective ones of the side poles; and
    power means electrically connected to each of the coils for powering the superconducting coil to levitate a vehicle and for powering the ambient temperature coils for adjusting the gaps.

2. A system according to claim 1, wherein the magnet is mounted to a vehicle for movement along the rail.

3. A system according to claim 1, wherein the area of the center pole is greater than the area of each side pole.

4. A system according to claim 3, wherein the power means comprises a quasi-dc power source connected to the superconducting coil, the ambient temperature coils being connected in series to each other with an ac power supply connected thereto.

5. A system according to claim 4, wherein the core and power supply are mounted to a vehicle for movement along the rail.

6. A system according to claim 1, wherein each of the center and side poles extend in a direction substantially transverse to the rail, and each of the respective coils being wound around each respective pole in planes extending substantially parallel to the rail.

7. A system according to claim 6, wherein the area of the center pole is greater than the area of each side pole.

8. A system according to claim 7, wherein the power means comprises a quasi-dc power source connected to the superconducting coil, the ambient temperature coils being connected in series to each other with an ac power supply connected thereto.

9. A system according to claim 8, wherein the core and power supply are mounted to a vehicle for movement along the rail.

10. A system according to claim 1, wherein the core is an iron core.

11. A system according to claim 1, wherein the center and side poles are aligned in a direction of movement of the magnet along the rail.

* * * * *